METHOD OF MAKING GROOVED RECORDS WITH COMPENSATION FOR REPRODUCTION ERRORS

Filed March 5, 1964

INVENTOR.

Duane H. Cooper

By: Stone, Mierman Burmeister & Zummer attys

United States Patent Office 3,403,233
Patented Sept. 24, 1968

3,403,233

METHOD OF MAKING GROOVED RECORDS WITH COMPENSATION FOR REPRODUCTION ERRORS

Duane H. Cooper, 804 S. Foley, Champaign, Ill. 61820

Filed Mar. 5, 1964, Ser. No. 349,617
19 Claims. (Cl. 179—100.4)

ABSTRACT OF THE DISCLOSURE

Tracing and tracking errors in phonograph reproduction are precompensated in the recording process by alteration of phase or delay of the signal being recorded. A derivative signal is employed for control of the tracing-error correction.

This invention relates to methods of making recordings of the needle-and-groove type and more specifically to a method of compensating, in the making of the records, for residual errors in the reproducing process due to disconformity between the shape and orientation of the cutting needle used in making the record and the needle of the reproducing equipment.

It has long been known that the reproduction of sound by the cutting and playing of grooved records is subject to distortion by reason of the difference in shape between the sharp cutting needle with which the original master is formed and the relatively blunt needle which is used in reproduction of the recorded material. The error was first recognized a number of decades ago in connection with hill-and-dale recording, or vertical groove modulation. A number of papers analyzing the effects of the difference between the shapes of the cutting and reproducing styli were written, demonstrating that a vertically modulated groove faithfully reproducing an electrical signal in turn corresponding to original audio material would produce a distorted reproduced audio material because the relatively blunt reproducing stylus would be driven alternately slightly ahead and slightly behind the actual groove shape because of the inherent change of the exact portion of the surface of the stylus which would be in contact with the interior of the groove. This error became reasonably well known as "tracing" error, but was never of very great significance in the early days of recording, since at that time it represented an effect of relatively minor order as compared with all of the other sources of distortion arising from other limitations on the recording and reproducing processes as then existing.

Another error which was recognized early is closely related, but actually distinct, being commonly known as "tracking" error. This error is the error of reproduction which comes from lack of correspondence between the direction of motion of the cutting needle with respect to the master disk, on the one hand, and the direction of motion of the reproducing needle with respect to the playback record, on the other hand, even though these motions are referred to as "lateral" or "vertical," which terms are actually only approximately correct in any practical equipment now known.

Tracing and tracking errors are primarily encountered in vertical modulation, and were accordingly given little attention in the many years during which lateral groove modulation became the standard and familiar manner of reproduction. When, in recent years, the 45–45 method of stereo recording was adopted, these old problems of tracing and tracking errors were not only restored to importance, but became much more important than they had ever been in the early days of vertical modulation, both because of the intervening improvements eliminating the more gross sources of distortion and because the vertical modulation in this system represents the separation or difference signal between the two channels. With present techniques, these tracing and tracking errors represent perhaps the most serious practical limitation on full fidelity of grooved-disk recording and reproduction.

Various attempts have heretofore been made to solve the problem of tracing and tracking errors. A large number of papers have been written both on the theoretical aspects and on devices and proposals for eliminating these sources of distortion. However, to date none of these has proven fully satisfactory. From the theoretical standpoint, perhaps the best heretofore proposed has been that described by Hunt at volume 10 of the Journal of the Audio Engineering Society, page 274. This involves a double-recording procedure in which the playback-distorted signal is itself recorded, and the compensation made using the complementary type of correction which has long been known to be possible. The difficulty, of course, is the practical one that the two-stage operation thus required introduces new problems of noise, maintenance of proper phase relations, etc., which are perhaps as serious as the original distortion problem.

Fox and Woodward, as described at volume 11 of the Journal of the Audio Engineering Society, page 294, have attacked the problem of tracing error in a somewhat different manner in a device used for some time in the commercial production of records, known as a "Correlator." This device employs time-sampling or scanning of the signals with correction in a manner which has been described in their published work, constituting in essence a fairly complex form of analog computation in which the signal being recorded is employed as the analog of an uncompensated groove and is combined with a voltage analog of the reproducing stylus shape to detect the point of contact, the latter being used for phase advance or delay of the signal to produce for recording a signal which simulates the playback-distorted signal of Hunt as regards tracing. Although the operation of this device appears reasonably satisfactory in eliminating tracing distortion, its results are necessarily limited by the general method it employs, and it is further subject to the objection of a fairly high degree of complexity. It is one of the basic objects of the present invention to provide a method of precompensating tracing error which avoids such complexity and limitations of performance. The tracking angle problem in itself (i.e., in the absence of tracing error) may be of course removed by a standardization of cutting angle in agreement with a standard pickup cartridge tracking angle. Adherence to a standard cutting angle is, however, not a simple matter, because there arise dynamic deformations of the cutter parts and of the record material, during cutting, which alter the angle from its designed value. Additionally, it is found that for the most accurate correction for tracing distortion to be achieved, such conforming of the cutting angle to the pickup tracking angle is not desirable, since the optimum tracing correction requires that a truly vertical cutting action be employed. This is true, for example, of the tracing correction procedures described by Fox and Woodward, in which the employment of the original signal as the analog of an uncorrected groove means that distortion in the recording process itself due to nonperpendicularity of the cutting needle motion prohibits a nonperpendicular cutter, so that the only manner of succeessfully eliminating tracking error heretofore suggested with such precompensation of tracing error is the relatively impractical idea of perpendicularity of both the cutting and the reproducing styli. In the present invention, the tracking error is also precompensated by processing or predistortion of the signal, rather than by placing difficult structural requirements on the recording and reproducing equipment. Further, as will later be observed, the method of the invention permits the use of a tipped cutter, if so desired, by suitable modification to include precompensation for this source of distortion.

The present invention stems from study of the basic phenomena of tracing and tracking distortion, analysis by means of use of skew transformation techniques, recognition of some fairly simple relationships which become observable, and utilization of these fairly simple relationships to permit the devising of an entirely new method of correcting or compensating the reproducing errors in the record-cutting process, permitting the full theoretical achievement of the corrections without the necessity of rerecording of reproduced disks, or similar complexities.

Both the broader aspects and the details of the method of the present invention may best be understood with the aid of the annexed drawing, in which.

Figures 1, 2, 3, 4:
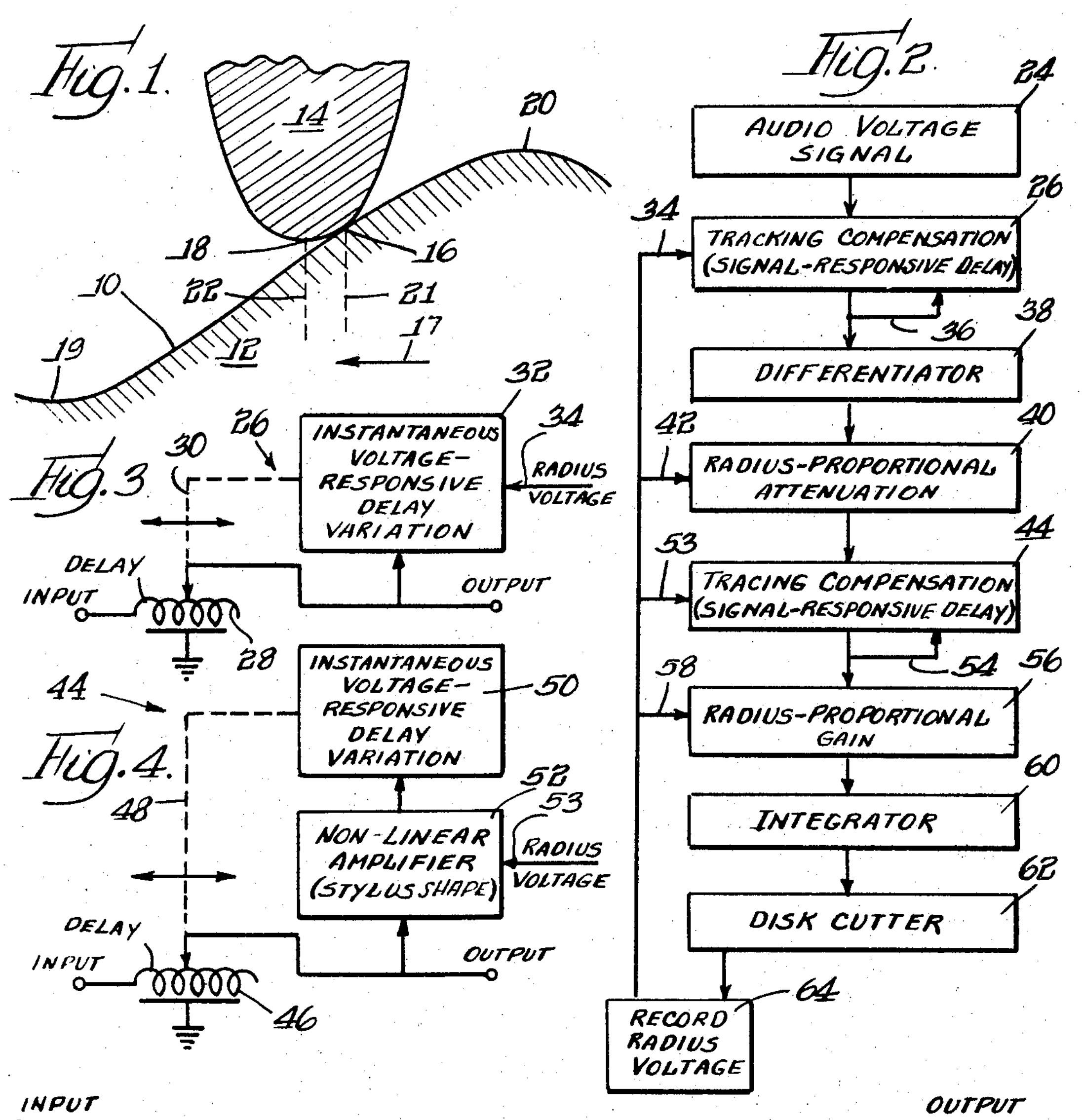
FIGURE 1 is a schematic view of the manner in which a stylus follows vertical modulation in a record groove in reproduction of the recorded music (or other intelligence), producing tracing and tracking distortion or error as between the groove modulation and the reproduced signal.
FIGURE 2 is a block diagram illustrating an error-compensating record-cutting system embodying the present invention.
FIGURE 3 is a schematic indication of the mode of operation of the tracking compensation portion of the device of FIGURE 2.
FIGURE 4 is a somewhat similar view, but showing the tracing-compensation portion.

The illustration of FIGURE 1 will be recognized by those skilled in the art as the analytical or explanatory diagram of tracing errors in the reproduction process which has become more or less conventional in the literature on this subject. As there shown, the record groove or modulated surface 10, previously cut in exact mechanical correspondence to the electrical waveform of the sonic signal, serves to drive the pickup transducer by means of the relatively blunt or rounded stylus or needle tip 14. Because of this roundness or bluntness, the actual contact or drive point 16 between the needle and the record is displaced from the center or "true" reproducing point 18. The illustration of FIGURE 1 shows the contact as made when the tip 14 is being driven upwardly by motion of the record in the direction represented by the arrow 17 (record moving to the left), i.e., as the contact point progresses from lowermost or bottom to uppermost or crest regions of the groove modulation.

At bottoms and crests of the groove modulation pattern (regions of zero slope), the contact point is of course the "true" reproducing point 18, but in all other positions the actual contact point 16 is displaced either forwardly or rearwardly from this center point. Thus the instantaneous displacement of the needle tip is fully correct (a term which of course refers to the relation between the tip position and the original sound signal to be reproduced) only at regions of maxima and minima of the modulated groove, but tip position as a function of time does not correspond to groove depth as a function of time in any intervening region, i.e., region of slope. For convenience of reference, the usual practice of referring to relative directions as "up," "down," etc., by reference to directions shown in the conventional diagram of FIGURE 1 is herein adopted, despite the obvious fact that the analysis and operation are the same in less usual orientations of record and reproducer as in the normal one.

Many analyses have been made of the distortion or error in reproduction caused by this "tracing" error. As earlier mentioned, various methods have heretofore been proposed and/or tried for correcting it. Also, it is very well known that a more or less analogous type of error arises from the fact that in actual practice the tip 14 does not move exactly vertically (as is suggested to be the case in FIGURE 1) but normally has a component of motion at a nonperpendicular angle to the record, so that the actual illustration of tracking error in a figure like that of FIGURE 1 would show the tip 14 extending upward and forwardly (to the left in this figure) rather than straight upward and the lateral coordinate or location of the contact point would accordingly change with the vertical level of the contact point, the needle responding to a point of the groove further to the right in the region of the deepest groove portions and further to the left in the region of crest portions, thus in essence undergoing lateral, as well as vertical, displacement with groove modulation. The matter of tracking distortion, and the manner of its correction, had been the subject of at least equally intensive study and experimentation in the prior art.

The present invention flows from some findings of both a qualitative and quantitative nature resulting from a study based upon recognition of the inability of the prior art to provide a fully satisfactory manner of correcting for these errors or distortions. The precompensation for such errors in the record-making process is of course not itself a novel concept, previous approaches likewise having been along this line, but not in any manner sufficiently simple and accurate to constitute a real solution to the problems. The prior art is particularly deficient in any manner of satisfactorily dealing with the tracing problem. Further, such solutions as have heretofore been devised to the tracking problem leave much to be desired, particularly in view of the heretofore unknown question of suitability for integration into a system combining precompensations for both kinds of error.

From consideration of the diagrammatic showing of FIGURE 1, certain observations may be made concerning the two errors invoved in reproduction, and these observations, followed by appropriate mathematical analysis, have resulted in the method of correction which is the subject of the present invention. As regards the tracking error, the relevant phenomena underlying the portion or aspect of the invention relating to this error in itself already appear in the literature and accordingly need not be set forth at this point. Both the illustration of FIGURE 1, and the further discussion thereof, are accordingly primarily directed to the matter of tracing.

In view of the fact that the instantaneous values of the stylus position at any adjacent crest and bottom, or vice versa, constitute "perfect" reproduction at these instants, the distortions which occur in the progression from a maximum to a minimum, or vice versa, may be considered as phase or time distortions, i.e., alterations of the time distribution of rate or speed of progression of the stylus between these two "reference points" at which the positions are independent of tracing error.

For simplicity, the consideration of the tracing error as phase or time error may best be considered by assuming a sinusoidal modulation, the applicability to any generalized waveform being demonstrable (if not hereafter obvious), since the only difference between a sinusoidal and nonsinusoidal signal for present purposes lies in the distribution of the progression rate between the adjacent minimum and maximum (or the reverse) before the tracing compensation.

As previously indicated, the center 18 of the tip 14 will be in contact with the groove bottom or minimum indicated at 19 and the crest or maximum at 20 at the fully correct instants of time, there being no error introduced at these times. It may be noted that this will be the case irrespective of the relation of the minimum at 19 to other minima in the recorded waveform, and of the relation of the maximum at 20 to the values of other maxima. At all other points, however, there will be an error or variation between the position of the stylus and the position which would be occupied by the ideal sharp point. It will be obvious that the dotted line 21, indicating the position on the groove actually driving the stylus 14, and the dotted line 22, indicating the position of the center 18, have between them a time or distance gap which may be considered a phase error, i.e., the instantaneous driving point of the groove surface is on a portion which was determined, in the cutting, by the cutting needle extension at a later time. The time differential between the horizontal point in the groove intended to control the vertical reproducing needle position at any instant and that which actually controls it may be seen to increase with increasing slope of the contacted portion, being maximum where this slope is maximum and disappearing to zero (coincidence between lines 21 and 22) at maxima and minima of the groove, with reversal of sign when the needle is moving downward (not illustrated). The required precompensation will be seen upon study to be that each element of the recorded signal must be (1) displaced in time (horizontal position) by an amount sufficient to make it the active or contacting point at the time when it is supposed to be effective and (2) altered in instantaneous amplitude (vertical position) in such manner that the stylus is brought to the proper height (a result which is not obtained by merely displacing the time scale to put the groove amplitude information now at 22 over to 21). The present invention utilizes the maxima and minima of the signal (and the groove) as reference points, and produces the amplitude correction as an element of the time correction itself utilizing the fact that any monotonic function can be transformed into any other monotonic function by suitable alteration of the ordinate scale, the corrected and uncorrected grooves of course being necessarily monotonic in each region between a minimum and a maximum.

The portion of the stylus tip which is instantaneously active will be seen to be uniquely identified with the slope of the groove surface contacted and thus with the instantaneous rate of change of the input electrical signal to the cutting needle at the time of cutting of that active portion. Conversely, since the uncorrected groove illustrated corresponds to the original signal, the slope or derivative of the latter represents an indicator of the required time adjustment. The manner of utilizing this relation to produce the desired correction may now be considered. It may be observed that the amplitude information alteration will not affect the slope, i.e., the slope to be produced at the new contact point (which will of course be intermediate between the points 16 and 18) will be exactly that which now appears as the slope of the original signal at the time 22. This results from the fact that the entire stylus moves as a unit, thus requiring the same groove slope for production of a given rate of change of output signal, irrespective of the point of contact being made. In summary, then, it may be seen that the required time delay for precompensation is determinable directly from the slope or rate of change of the uncompensated signal to be recorded and that reproduction of this slope at the point on the record so determined is required. Additionally, the successive instantaneous slopes of course constitute a derivative or velocity waveform from which the signal may be reconstructed.

Accordingly, when the original signal to be recorded is converted to a derivative or velocity signal, and each instant or element of the velocity signal is delayed by an amount properly corresponding to its own instantaneous value, there will result a distorted velocity signal which may then be integrated to form a recording signal which will precompensate for tracing error in the reproducing stylus which will later be used, and the matter of amplitude correction need not be separately treated, being automatically corrected in the velocity delay.

The above qualitative discussion may be validated by mathematical demonstration that the tracing error may be described or analyzed in terms of representation in skew coordinates, i.e., by skew transformation of the simple horizontal and vertical coordinate system of FIGURE 1, and appropriate equations may be set up and solved to demonstrate the fact that correction may be made by employing for the recording signal an integrated derivative or velocity signal of which the instantaneous values are delayed in the manner just described. As might reasonably be expected, the delay required, as shown by such analysis, is expressed as a function having continued or repeated argument, confirming that the delay of the delayed velocity signal should be controlled by the output of the delaying device itself, for theoretically accurate correction; the use of the undelayed signal at the input to the delay device to control the delay is not in strict accordance with theory. The mathematical analysis through which these conclusions were originally reached and may be verified is not basically necessary for understanding of the invention, and accordingly is not presented here, being set forth in general content in papers of the present inventor published in IEEE Transactions on Audio, vol. AU–11, number 4, page 141, and Journal of the Audio Engineering Society, vol. 12, No. 1, page 2.

It has heretofore been shown by the present inventor in IEEE Transactions on Audio, vol. AU–11, number 2, page 141 that tracking error may be precompensated by a suitable delay or phase adjustment which is a simple function of instantaneous signal amplitude. It is important to note, however, that for fully satisfactory correction of both tracking and tracing errors, the signal which is to be recorded must first be treated or distorted to precompensate for the tracking error before the tracing error correction is applied.

The general method thus described, when studied, will be found to be capable of implementation in a large variety of ways, but particularly advantageous embodiments are illustrated in FIGURES 2 through 5. It will of course be understood that such obvious provisions as ordinary linear amplification, conventional recording equalization, etc., are omitted from the description.

An overall system for use of the method is shown in FIGURE 2, and FIGURES 3 through 5 present schematically the operation of certain of the components shown merely as blocks in FIGURE 2, which may also be considered as a process or flow diagram of the signal treatment.

The signal to be recorded, shown at 24, is the signal which is intended to be ultimately generated in the pickup transducer head; accordingly the usual frequency-response "standard equalization" has already been applied. This signal is first fed to the tracking compensation wherein all successive instantaneous values are delayed by amounts or times corresponding to the instantaneous voltage values themselves. This portion of the signal-processing is shown in FIGURE 3, in which it may be seen that the input signal is fed to a variable delay line 28. The time delay of the delay line 28 is controlled, as indicated by dotted coupling 30, by the output of a delay variation drive 32, whose input constitutes the output from the delay line and also the output to the next stage of the process. It will be seen that with such a system the mathematical expression for the output voltage as a function of the input voltage at any given time is a function of the type having the function itself as a part of its argument, and accords completely with the theoretical requirements for correction shown by the mathematical treatment previously mentioned, provided that the loop time is very small as will of course be the case, so the actual required delay to be produced in the variation drive device 32 may be calculated from the simple and well-known tracking error theory without regard to the feedback aspect, i.e., the drive 32 may be a simple linear amplifier with the gain which would be suitable for producing the desired delay, without considering the slope or derivative of the input signal, which would be required if the loop time were such that there could be any substantial change in signal amplitude during the establishment of equilibrium at any particular instantaneous signal value. It may also be seen that although the full theoretical correction requires that the delay be controlled by the delayed signal itself, the residual error caused by using the uncorrected signal as the delay control is small compared to the full original error.

It will be observed that the delay variation drive also has a control input 34 designated as "radius voltage"; the purpose of this provision will be discussed later, it being merely necessary for present purposes to note that the above discussion of FIGURE 1 has considered the relative motion between the record and the stylus as being of constant speed, and the method will first be described on this assumption, the effects of radius variation thereafter being considered. Additionally, as those skilled in the art will readily observe, where the illustrated system is one stereo channel, the input to the drive 32 is not solely the signal being treated; in such a case there is also an input from the other channel and the drive is responsive to the difference and controls the delay in both channels.

Returning now to FIGURE 2, it will be observed that the feedback loop associated with the tracking compensation at 26 is shown also at 36 as a control connection from the output. The intelligence signal, thus precompensated or predistorted for tracking error, is now fed to a differentiator 38, converting it to a derivative or velocity signal. This signal is fed through an attenuator 40, controlled in attenuation as indicated at 42, and thence to the tracing compensation device 44. The purpose of the attenuation stage 40 is presently not described, this provision likewise being connected with the matter of linear speed variation, and accordingly deferred.

The tracing compensation device 44 is shown in FIGURE 4. The variable delay line 46, the dotted indication 48, and the delay variation drive 50 are in all respects essentially identical with those previously described in connection with the tracking compensation. The primary difference lies in the provision here made of a nonlinear amplifier (or other amplitude-distorting device) 52 in the line feeding the input of the delay variation device from the output of the delay line 46. A radius voltage provision 53 is also introduced here, as in the previous case.

The function of the radius control will of course be deferred, but the provision of the nonlinear converter or coupler 52 may now be explained, and it is advantageous to return to consideration of FIGURE 1 in so doing. It will be remembered that the delay variation drive device 50 and the coupling 48 of FIGURE 4 are provided for the purpose of introducing the amount of delay which is required to displace in time (i.e., in horizontal location) the height and time intelligence which is recorded at 22, i.e., beneath the center 18 of the stylus, in the uncorrected record. As previnously indicated, no special provision need be made for correction of the amplitude or level if the time or phase compensation is made in the derivative or velocity signal, since the amplitude correction will automatically appear when the velocity signal is integrated. In the previous discussion, it was demonstrated that the required delay may be determined from the velocity signal, i.e., that it is fully identified from the slope of the groove at the contact point, but the relationship of the two, or expression of the delay as a function of the slope, was elaborated. By simple geometry, the horizontal correction required for any given slope may be shown to be directly proportional to the slope if the needle tip is parabolic in shape, the factor of proportionality being determined by the vertex curvature of the parabolic tip. For other shapes of the needle tip, exact correction requires a delay which is a nonlinear function of the slope, which may be computed in a simple manner for any tip shape which may be expressed as a simple function, or may be determined by curve-fitting and similar techniques in the case of tip shapes not readily expressed in a form suitable for computation. In the case of spherical tip, the required displacement is the product of the radius of curvature and the sine of the arctangent of the slope. For perfect correction, accordingly, the nonlinear amplifier or converter is essentially a simple analog computer having the desired function built in. As a practical matter, however, this nonlinear conversion is required only if the correction is desired to be made to a degree of accuracy such that the residual distortion cannot be detected by instruments of substantially greater distortion sensitivity than the ear of even a highly critical music listener. For most practical purposes, treatment of the reproducng tip as parabolic produces substantially negligible error, so that the question of whether the nonlinear provision should actually be incorporated in a practical system is one upon which agreement will not be universal, the improvement by way of elimination of tracing error without consideration of the deviation from theoretical perfection probably being adequate for many or most purposes. This is particularly true in view of the fact that manufacturing tolerances and similar practical matters create at least minor variations in needle tip shape in any event. However, there will undoubltedly be numerous special applications where the quality or completeness of the correction is desired to extend to the full theoretical achievement, and in such utilizations of the invention, the nonlinear conversion of derivative or velocity signal amplitude to delay time, based on calculation from exact needle shape, should be used.

Again returning to FIGURE 2, the feedback or output control of the tracing compensation stage or device 44 is shown at 54. The tracing compensation stage is followed by a radius-controlled gain stage 56 under the control of a signal introduced at 58, the function of which will shortly be pointed out. Integration of the resultant signal by a suitable integrating circuit 60 produces a fully precomepnsated or predistorted representation of the orignal audio voltage signal from 24 which may now be recorded by a conventional cutting-needle mechanism at 62 to produce a master which may be employed for quantity manufacture of grooved records fully precompensated for tracing and tracking errors in the reproducing equipment.

It will by now have been observed, particularly in view of the illustration and mention of the radius corrections, that the discussion has up till now considered distance along the record groove and time as in essence identical, i.e., has considered that the linear speed of the groove with respect to the stylus is a constant. Actually, of course, this is not the case. Were the radius-correction devices previously mentioned, and now to be described, omitted, the present invention would be usable solely for records of a type in which such an assumption holds; as, for example, grooved records of the endless belt type. The nature of the corrections required by the alteration of relative speed with radial portion of the record will be discussed in connection with the further discussion of the provisions made therefor.

First and most simply, there may be considered the matter of the effect of linear speed on the tracking error correction. In this case, because the required delay in terms of the horizontal space coordinate system of FIGURE 1 is determined solely by the instantaneous value of the signal voltage (or uncorrected groove shape), conversion of the required correction from the time delay required at one speed to the time delay required at another speed, from the same delay control information extracted from the signal, is merely a matter of making the time delay produced by any given signal value an inverse function of the linear speed. Thus if there is provided an auxiliary 64 to the disk cutting mechanism which is coupled by the line 34 to the tracking compensation device 26 to reduce the time delay by a factor proportional to the radius, and thus to the linear speed, the horizontal spatial delay for any given signal amplitude will be constant, i.e., the time delay introduced by the delay device 28 of FIGURE 3 will properly represent the required space delay for elimination of tracking error.

In FIGURES 2 and 3, the drawing, for convenience, illustrates the radius correction as a voltage produced in the auxiliary 64 and fed to a two-input corrective drive 32. As will be recognized, this convenient representation is only one of many obvious ways of doing this, perhaps the simplest being a simple division-attenuator network, mechanically driven. It will be understood that the basic method may be practiced with a large variety of combinations of "hardware" well known for other purposes, so that even the fairly generalized block and schematic diagrams of the drawing represent only a single embodiment.

In the case of the tracing compensation, the effect of radius is much less simple. It will again be convenient to make reference to FIGURE 1 in this discussion. One effect of radius will of course be that which is analogous to the effect of radius on the tracking compensation requirement. Here, as there, the time correction required for producing the correction represented as spatial in FIGURE 1 (which is in itself completely independent of time) must use an inverse speed factor where time delay is used to compensate for what is basically a spatial error. However, correction of the time-to-space relation from this standpoint is not in itself adequate in the case of the tracing compensation, because, in addition to the change of space-time relation, the linear speed also alters the proper meaning or interpretation of the velocity signal as an indicator of mechanically viewed signal slope. Here again, the electrical signal derivative must have applied to it an inverse radius or linear speed factor before it is meaningful in indicating the actual mechanical slope of the groove modulation.

For conceptual clarity, the drawing shows the two components of the radius correction separately applied, even though they may of course be combined in a single inverse square correction if so desired, if the nonlinearity provision required for theoretically perfect compensation for actual commercial stylus shapes is neglected. As shown in the drawing, conceptually related to the above explanation of purpose, a control is exercised at 42 on an attenuator 40 to attenuate or divide the velocity signal by a factor proportional to the radius before it enters the tracing compensation system 44. In effect, this converts the instantaneous values of signal rate of change to instantaneous values of mechanical groove slope. The inverse radius signal applied at 53 to the tracing compensation system again applies the same factor, this time used for the purpose of preserving the appropriate relationship to make the time delay of the system correspond to the space delay now properly indicated to be required, and thus being applied at a point such as to alter amplification or attenuation of the signal as already nonlinearly distorted. Since no permanent alteration of the signal amplitude is desired, the attenuation earlier introduced is now reverse by radius-proportional gain or multiplication of the signal at 56, under control of the radius signal 58, so that when the signal is now integrated at 60, the only net alteration through the system is the precompensation or predistortion which will result in error-free reproduction of the original audio voltage when the recorded intelligence is later reproduced with the tracking and tracing errors caused by the difference between the stylus system used for reproducing and the stylus system used in the cutting. As will be obvious, the necessity of restoration at 56 of the original values may be eliminated by moving the radius correction now shown in the signal line at 42 so that it is applied only in the delay-control loop (at the input thereto).

In stereo use the tracing compensation, unlike the tracking correction, is made in each channel without reference to, or dependence upon, the other. In the tracking compensation, the compensating relay is the same for both channels, being controlled by their difference, and thus only partially controlled by each. In the tracing compensation, the signal (already corrected for tracking in each channel) is corrected for tracing in the two channels independently. Also, as in the tracking compensation, it will be readily seen that although the theory indicates that the delay should be controlled by the delayed signal itself, the bulk of the tracing error may be eliminated by controlling the delay in response to the signal at the input to the delay device. In such a case, of course, further simplification may be affected, eliminating the integration provision at 60, since the signal may be delayed in its original (undifferentiated tracking-corrected) form, the differentiated or velocity signal being produced in a branch used solely for the delay-control.

In the illustrations of FIGURES 3 and 4, the controlled delay devices respectively indicated at 28 and 46 are shown in the form more or less conventional for the type of device in which delay is produced by time of progression along a "line" of lumped or distributed reactances. Where such a delay device is employed, the dotted couplings 30 and 48 may represent here a coupling of the mechanical type, wherein a take-off tap from the line is varied, or of the electrical type wherein the constants of the line are varied. However, it will be appreciated that the illustration is in this respect more or less arbitrary as regards the symbol employed, any type of delay device being suitable. One example of another manner of producing the required delays is shown in FIGURE 5, illustrating the adaptation to the present system of a general type of signal-treating device heretofore used for different purposes, with appropriately changed construction.

Figure 5:
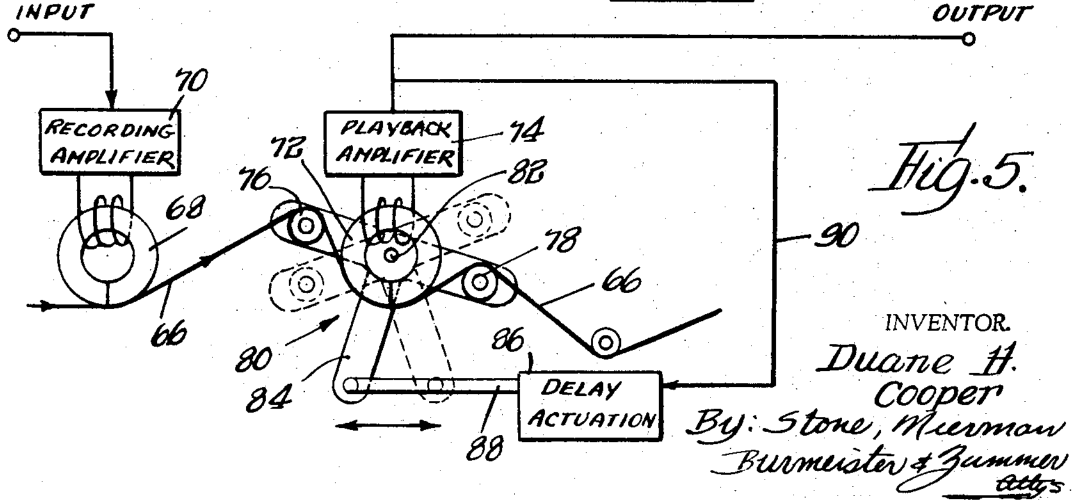
FIGURE 5 is a further schematic view illustrating one manner in which a variable delay involved in the error-compensating process may be obtained.

The device of FIGURE 5 employs for the relative delay and advancement of instantaneous portions of the signal a system in which the signal is recorded on a tape and the relative timing or phasing is altered by means of modulation of the instantaneous speed of the tape in passing through a pickup head. The tape 66 may either be fed from a supply spool (not shown) or may be an endless tape which is circulated through the system. In either event, it is erased so as to be free of signal prior to the recording at the recording head 68, at which the input signal is recorded by means of a suitable amplifier 70. The tape with the signal so recorded is passed to a playback head 72, the output of which is fed to a playback amplifier 74 which constitutes the output of the illustrated system.

The delay variation is accomplished by the mechanism associated with the feeding of the tape through the playback head. The path of the tape includes a pair of idlers 76 and 78 which are mounted on a T-shaped yoke 80 which is pivoted at a point 82 such that as the yoke is swung, the idlers 76 and 78, which are on opposite sides of the pickup head as regards the path of the tape, are swung through positions such that if the tape were externally stationary, the motion of the yoke would produce slight relative motion between the tape and the pickup head, without substantial change in the overall tape path length. With the tape externally in constant-speed motion, the pivotal action of the yoke produces phase distortion or alteration of the output. The stem or drive lever 84 of the yoke 80 is driven by a delay actuator 86 by means of a drive rod 88, and the input voltage to the actuator 86 is provided from the output line by a feedback connection 90. The delay actuation system 86, it will of course be understood, includes appropriate provision for making the delay a nonlinear function of output signal amplitude (where required) and for the radius correction.

It will be observed that the above discussion has largely been limited to matters of relative delay of portions of the signal appearing on the generalized portion of the slope illustrated in FIGURE 1. Obviously, in the case of portions of the signal in which the slope is in the opposite sense, the operation to be performed (in the case of tracing) is advance of the phase, rather than delay. In the case of the tape recording embodiment of FIGURE 5, it is evident that tilting of the yoke in one direction produces delay and the other produces advance, with respect to the reference median position. It will likewise be observed, however, that in the case of the delay line, it is merely necessary to consider some fixed value of the delay (which prevails at maxima and minima in the tracing error compensation) as the reference, with greater or lesser delays representing relative advance and retardation.

It will immediately be obvious to persons skilled in the art that the invention may be practiced with a large number of variations from the schematic illustration of the drawing, some being immediately obvious and others apparent after study. For example, it will immediately be apparent that it may be desirable to perform portions of the recording operation at different times or places. The signal may, if desired, be recorded on tape, and further processing deferred at any point. Where any part of the compensation is to be performed at a different time than the actual record-cutting, the radius-correction signal may be simulated by an appropriate time-function voltage, with the ultimate location on a disk of course readily known. By the same token, it may be convenient to perform a speed-conversion and speed-reconversion in the processing, particularly in connection with one or both of the delay devices. Simplicity and economy of equipment design, particularly where the delay is to be varied by apparatus which is partially mechanical (as in the case of a device like that of FIGURE 5), may indicate the desirabiilty of (for example) expanding the time scale by running a signal tape at slow speed, performing the delay distortion with a signal so produced to eliminate problems of design of a mechanical system for the otherwise high frequencies, and then inverting the time-base change by the inverse procedure on a tape recording of the delayed signal. The system readily adapts itself to such modifications, with the necessary adjustment of delay versus instantaneous value factors, etc., to produce the appropriate space advance or retardation in the ultimate record.

The invention has been described above in connection with embodiments wherein the time delays are continuously variable, rather than variable in steps. However, the use of, for example, discrete taps on a delay line of fixed electrical characteristics, lumped or distributed, is obviously within the teachings of the invention; in such an embodiment, the delay variation is simplified by the abiilty to use electronic switching (gating) of connections from the taps in response to the instantaneous amplitude of the signal (or dreivative signal). Of course, such a stepwise delay variation cannot accomplish the full theoretical compensation. However, the residual error due to this cause can be made vanishingly small by use of any desired close spacing of the taps.

Other modifications, less obvious, can further be made. The above analysis assumes that the motion of the cutting needle is itself "perfect," i.e., that the modulation as cut by the cutting needle is a perfect reproduction of the cutting transducer input signal. This requires perpendicularity of the cutting needle to the master record surface. In general, slight tipping of the cutting needle such as occurs in actual equipment causes relatively small distortion. However, it will be seen that the distortion of a tipped cutting needle represents a limiting factor on the degree of perfection of elimination of tracing and tracking error. A slightly tipped cutting needle may be made to simulate, or act as, a perpendicular cutting needle by a delay variation at the cutting head which is generally similar to the tracking delay variation.

It will also be noted that the single-channel discussion above relates to hill-and-dale recording, rather than to the lateral type of monaural recording which has long been in use. Although tracing error produces relatively small distortion in lateral recording, the system as described may be used for correction of tracing and tracking errors in lateral monaural recording in the same general manner as in the stereo case.

In addition to the modifications just discussed, many others, some obvious and some less obvious, will be found by persons skilled in the art. Accordingly, the scope of the protection to be afforded the invention should not be limited to the particular embodiments herein described, but should be determined in terms of the definitions of the invention in the appended claims and equivalents thereof.

What is claimed is:

1. In the cutting of grooved records, the method of compensating for tracing distortion comprising:

(a) generating a velocity signal corresponding to the derivative of the audio signal to be recorded, (b) delaying successive instantaneous values of the velocity signal by times corresponding to such values, and (c) integrating the signal thus produced to form a tracing-corrected audio signal.

2. The method of claim 1 characterized by:

(d) the delay of successive instantaneous values of the velocity signal being varied in accordance with the instantaneous values as thus delayed.

3. The method of claim 1 characterized by:

(d) the delay being a linear function of the instantaneous value and tracing error being substantially fully compensated for a parabolic reproducing needle.

4. The method of claim 1 characterized by:

(d) the delay being a nonlinear function of the instantaneous value and tracing error being substantially compensated for a reproducing needle of shape other than parabolic.

5. In the cutting of grooved records, the method which comprises:

(a) generating a program signal corresponding to program material to be recorded, (b) delaying successive instantaneous values of the program signal by times varying in accordance with such instantaneous values to produce a tracking-corrected signal, (c) generating a velocity signal corresponding to the derivative of the tracking-corrected signal, (d) delaying continuously successive instantaneous values of the velocity signal by times varying in accordance with such instantaneous values, and (e) integrating the signal thus produced to form a program signal compensated for both tracking and tracing errors.

6. The method of claim 5 characterized by:

(f) the delay of the instantaneous values of both the program signal and the velocity signal being varied in accordance with the instantaneous values of the respective signals as thus delayed.

7. The method of claim 5 characterized by:

(f) the delay of the program signal being a linear function of the instantaneous values, and (g) the delay of the velocity signal being proportional to the sine of the arctangent of values proportional to the velocity signal values.

8. The method of cutting record disks comprising the method of claim 5 characterized by:

(f) the delays for any given instantaneous value of the program signal and the velocity signal being varied to compensate for location of each recorded portion on the record.

9. In the cutting of grooved phonograph disks, the method comprising:
(a) generating a velocity signal corresponding to the derivative of a program signal to be recorded,
(b) delaying successive instantaneous values of the velocity signal by times corresponding to such values as so delayed and to the radius at which the particular portion is to be recorded, and
(c) integrating the signal thus produced to form a program signal compensated for tracing error.

10. In the cutting of grooved records, the method comprising:
(a) generating a program signal,
(b) producing a derivative signal from the program signal,
(c) producing an altered program signal advanced and retarded in approximate proportion to the corresponding value of the derivative signal, the magnitude of said proportion being altered at least at intervals, and
(d) cutting a master record with the signal so altered, and forming further records by use of such master,
(e) each part of the program signal being recorded at a radius approximately corresponding to the valve of said proportion magnitude.

11. The method of compensating for tracing error in the making of grooved records comprising producing a derivative signal from a program signal to be recorded, delaying the derivative signal in accordance with its own values, and producing a precompensated signal having successive portions delayed with respect to the program signal by amounts varied in response to the delayed derivative signal.

12. The method of claim 11 wherein the derivative signal is integrated to form the precompensated signal.

13. The method of claim 12 wherein the delay is produced by feeding the differentiated signal through an electrically variable delay device, the output thereof electrically varying the delay.

14. The method of compensating for tracking and tracing errors in the making of grooved records comprising delaying successive portions of a program signal being recorded by amounts varied in response to the signal, differentiating the delay-altered signal thus produced, delaying successive portions of the differentiated signal by amounts varied in response thereto, and then integrating this second delay-altered signal.

15. The method of compensating for tracking and tracing errors in the making of grooved records comprising first precompensating a program signal to be recorded for tracking error, and then precompensating the tracking-corrected signal so produced for tracing error, and thereafter recording the signal so pre-compensated for both tracking and tracing error on a grooved record.

16. In a process for making grooved phonograph records, the method of compensating for tracking error comprising delaying successive portions of a program signal by amounts varied at least partially in response to the instantaneous amplitude of the program signal, and recording the signal as so varyingly delayed.

17. The method of claim 16 wherein the signal is one channel of an overall stereo signal, and is delayed in accordance with the difference between the instantaneous amplitudes of the signals in the two channels.

18. A method of precompensating a signal to be recorded for reproduction errors by employment of a delay-control signal of the same general frequency content as the recorded signal including the steps of:
(a) recording the signal on an elongated recording medium moving at constant speed,
(b) passing the recording medium over a path including a pickup transducer station, and
(c) altering the phase of the signal produced by the transducer at such station with respect to the phase of the recorded signal by altering the lengths of the portions of said path between the transducer station and the respective ends of the path in accordance with the delay-control signal, to alternate the speed of the medium relative to the transducer about said constant speed in accordance with the delay-control signal.

19. In a method of making grooved records precompensated for tracing error including controlling the delay of a variable delay device by feeding to the control portion thereof a delay-control signal representative of the slope of the program signal to be recorded, the improvement characterized by altering the magnitude of the delay-control signal in accordance with the recording radius, while leaving the delay range of the device unaltered.

References Cited

UNITED STATES PATENTS

| | | | |
|---|---|---|---|
| 2,963,555 | 12/1960 | Brubaker | 179—100.2 |
| 3,229,048 | 1/1966 | Fox | 179—100.4 |

BERNARD KONICK, *Primary Examiner.*

R. F. CARDILLO, *Assistant Examiner.*

UNITED STATES PATENT OFFICE

CERTIFICATE OF CORRECTION

Patent No. 3,403,233 September 24, 1968

Duane H. Cooper

It is certified that error appears in the above identified patent and that said Letters Patent are hereby corrected as shown below:

In the heading to the printed specification, line 5, "804 S. Foley" should read -- 918 W. Daniel Street --. Column 4, li 44, "invoved" should read -- involved --. Column 7, line 63, "previnously" should read -- previously --; line 73, after "was insert -- not --. Column 8, line 46, "comepnsated" should read -- compensated --; line 46, "orignal" should read -- original - Column 10, line 8, "relay" should read -- delay --. Column 11, line 38, "desirabiilty" should read -- desirability --; line 55 "abiilty" should read -- ability --; line 58, "dreivative" shou read -- derivative --. Column 13, line 24, "valve" should read -- value --. Column 14, line 4, "pre-compensated" should read -- precompensated --.

Signed and sealed this 3rd day of March 1970.

(SEAL)
Attest:

EDWARD M.FLETCHER,JR.
Attesting Officer

WILLIAM E. SCHUYLER, JR
Commissioner of Patents